United States Patent
Wright et al.

(10) Patent No.: US 10,894,595 B1
(45) Date of Patent: Jan. 19, 2021

(54) SPRING DETENT FOR OVER-RIDABLE INTERCONNECT

(71) Applicant: Rockwell Collins, Inc., Cedar Rapids, IA (US)

(72) Inventors: Andrew M. Wright, Costa Mesa, CA (US); Paul D. March, Chino Hills, CA (US); Noelle E. Wadsworth, Huntington Beach, CA (US); Andrew S. Murrell, Rancho Cucamonga, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 390 days.

(21) Appl. No.: 15/659,469

(22) Filed: Jul. 25, 2017

(51) Int. Cl.
 *B64C 13/28* (2006.01)
 *G05G 5/08* (2006.01)

(52) U.S. Cl.
 CPC ............ *B64C 13/343* (2018.01); *B64C 13/28* (2013.01); *G05G 5/08* (2013.01)

(58) Field of Classification Search
 CPC .......... B64C 13/28; B64C 13/343; G05G 5/08
 USPC .... 74/480 R, 473.25–473.28, 527; 244/99.4; 403/109.2–109.4, 322.2
 See application file for complete search history.

(56) References Cited

U.S. PATENT DOCUMENTS

| | | | | |
|---|---|---|---|---|
| 2,451,730 A | * | 10/1948 | Greenlee | F16B 1/00 74/527 |
| 3,480,291 A | * | 11/1969 | Hilfiker | B62D 31/006 280/777 |
| 4,403,756 A | * | 9/1983 | Berlin | B64C 13/46 244/227 |
| 4,681,286 A | * | 7/1987 | Church | B64C 1/1407 244/118.5 |
| 4,775,269 A | * | 10/1988 | Brix | B23Q 3/12 279/78 |
| 5,141,084 A | * | 8/1992 | Lang | B60T 1/062 188/71.4 |
| 5,456,428 A | * | 10/1995 | Hegg | B64C 13/12 244/229 |
| 5,493,497 A | * | 2/1996 | Buus | G05D 1/0077 701/4 |
| 5,782,436 A | * | 7/1998 | Pohling | B64C 13/12 244/229 |
| 5,797,564 A | * | 8/1998 | Cartmell | B64C 13/22 244/223 |
| 5,806,806 A | * | 9/1998 | Boehringer | B64C 13/505 244/196 |
| 6,050,161 A | * | 4/2000 | Tremblay | B23B 5/162 82/113 |

(Continued)

*Primary Examiner* — Bobby Rushing, Jr.
(74) *Attorney, Agent, or Firm* — Suiter Swantz pc llo

(57) ABSTRACT

A redundant mechanical control system incorporates a jam override subsystem to enable a breakout or break-away feature of the redundant mechanical control system. The jam override subsystem includes a spring and detent system to apply an axial force to a portion of an interconnect. The interconnect mechanically links a first portion of the redundant mechanical control system with a second portion. When a failure occurs, rendering inoperable the first portion or the second portion of the redundant mechanical control system, the axial force of the spring and detent system is overridden by a compression or extension force of the operable portion of the redundant mechanical control system.

9 Claims, 10 Drawing Sheets

(56) References Cited

U.S. PATENT DOCUMENTS

| | | | | |
|---|---|---|---|---|
| 6,672,565 B2* | 1/2004 | Russell | ............ | E21B 21/106 |
| | | | | 251/297 |
| 6,913,226 B2* | 7/2005 | Huynh | ............ | B64C 13/341 |
| | | | | 244/75.1 |
| 6,923,405 B2* | 8/2005 | Cline | ............ | B64C 13/42 |
| | | | | 244/99.4 |
| 6,948,410 B1* | 9/2005 | Larson | ............ | B25B 23/1427 |
| | | | | 173/176 |
| 6,981,409 B2* | 1/2006 | Huynh | ............ | G01L 5/22 |
| | | | | 244/224 |
| 6,986,249 B2* | 1/2006 | Bernard | ............ | B64C 13/12 |
| | | | | 60/571 |
| 7,316,370 B2* | 1/2008 | Sankovic | ............ | F42B 10/64 |
| | | | | 244/3.27 |
| 7,559,510 B1* | 7/2009 | Bae | ............ | B64C 13/0423 |
| | | | | 244/223 |
| 9,437,056 B2* | 9/2016 | Huynh | ............ | B64C 13/16 |
| 9,482,255 B2* | 11/2016 | Changsrivong | ............ | B62D 31/006 |
| | | | | 280/777 |
| 2002/0071719 A1* | 6/2002 | Moore | ............ | F16C 7/02 |
| | | | | 403/322.2 |
| 2003/0183728 A1* | 10/2003 | Huynh | ............ | B64C 13/345 |
| | | | | 244/224 |

\* cited by examiner

SPRING DETENT FOR OVER-RIDABLE INTERCONNECT

BACKGROUND

Mechanical control systems are susceptible to jam conditions. For example, debris, tools, animals, birds, or foreign objects may enter a portion of a mechanical control system and cause mechanical failure leading to a jam condition. By way of another example, an operator may lose consciousness and lodge an arm or a leg in a path of the mechanical control system such that a full range of motion of the mechanical control system may not be obtained without potentially injuring the operator to remove an obstruction the operator, or an appendage of the operator, may be causing. By way of yet another example, a motor subsystem of the overall mechanical control system may fail, rendering remaining portions of the mechanical control system unusable.

A vehicle implementing a redundant or parallel mechanical control system is often under strict industry guidelines or federal regulations to maintain control despite any condition that may render the vehicle inoperable. For example, for airworthiness standards for transport category aircraft, regulations may be found in 14 C.F.R § 25. Compliance with these and other regulations and guidelines must be demonstrated by any new, improved, or updated mechanical control system. Direct interconnects between halves of a parallel or redundant system may fail to provide full compliance with industry standards or federal regulations. While some conventional systems do utilize an override function, these conventional systems have heavy, dual-action springs that require a continuous additional force to separate halves of the redundant or parallel system. Repairing these conventional systems, reconnecting the separated halves, or breakout forces associated with these conventional system includes significant workload.

Further, minimizing or optimizing size, weight, power, and cost (SWAP-C) requirements and considerations for almost any vehicle component often leads to increased fuel economy, increased maneuverability, increased durability, or other similar advantages.

SUMMARY

In one aspect, embodiments of the inventive concepts disclosed herein are directed to a redundant mechanical control system. The redundant mechanical control system may include a first actuating portion, a second actuating portion, a break-away interconnect, and a jam override subsystem. The jam override subsystem may include a detent apparatus to provide an axial force. The break-away interconnect may mechanically link the first actuating portion and the second actuating portion together until an overriding breakout force is received by the jam override system. The overriding breakout force being larger than the axial force of the detent apparatus.

In a further aspect, the inventive concepts disclosed herein are directed to a jam override system. The jam override system may include a detent apparatus, where the detent apparatus may include a spring and plunger assembly for applying an adjustable axial force to a lock-ball of the detent apparatus. The jam override system may further include an inner tube having a hole or a lock-ball seat therein to seat a portion of the lock-ball. The jam override system may further include an outer tube with a diameter that is larger than a diameter of the inner tube at a junction of the inner tube and the outer tube. The larger diameter may allow the inner tube to move through the outer tube when an overriding force is received at an end of the outer tube or received at an end of the inner tube.

In a further aspect, the inventive concepts disclosed herein are directed to a jam override detent apparatus. The detent apparatus may include a spring and a plunger assembly for adjustably applying a first force. The first force may include an axial force. The detent apparatus may include a lock-ball for receiving the first force from the spring and plunger assembly and for moving along an interconnect upon receiving a second force; the second force being larger than or overriding the first force. The second force may include a compression or extension force. The detent apparatus may further include a breakout housing to house a portion of an inner tube of the interconnect, to house the spring and plunger assembly, and to house the lock-ball. The housed portion of the inner tube may include a first diameter that is smaller than a second diameter of an outer tube of the interconnect at a junction of the inner tube and the outer tube. The smaller diameter of the inner tube may enable a telescopic effect resulting from the second force.

In a further aspect, the inventive concepts disclosed herein are directed to a method of actively monitoring a spring detent apparatus. The method may include applying a first force to a break-away interconnect of a redundant mechanical control system via a jam override subsystem. The method may include applying a second force to the break-away interconnect, the second force resulting from a compression force or an extension force applied at a distal end of the break-away interconnect. The method may include monitoring the break-away interconnect or a detent apparatus of the jam override subsystem to determine when the second force is applied, resulting in a breakout condition. The method may further include resetting the detent apparatus after the second force is applied and after the breakout condition occurs.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
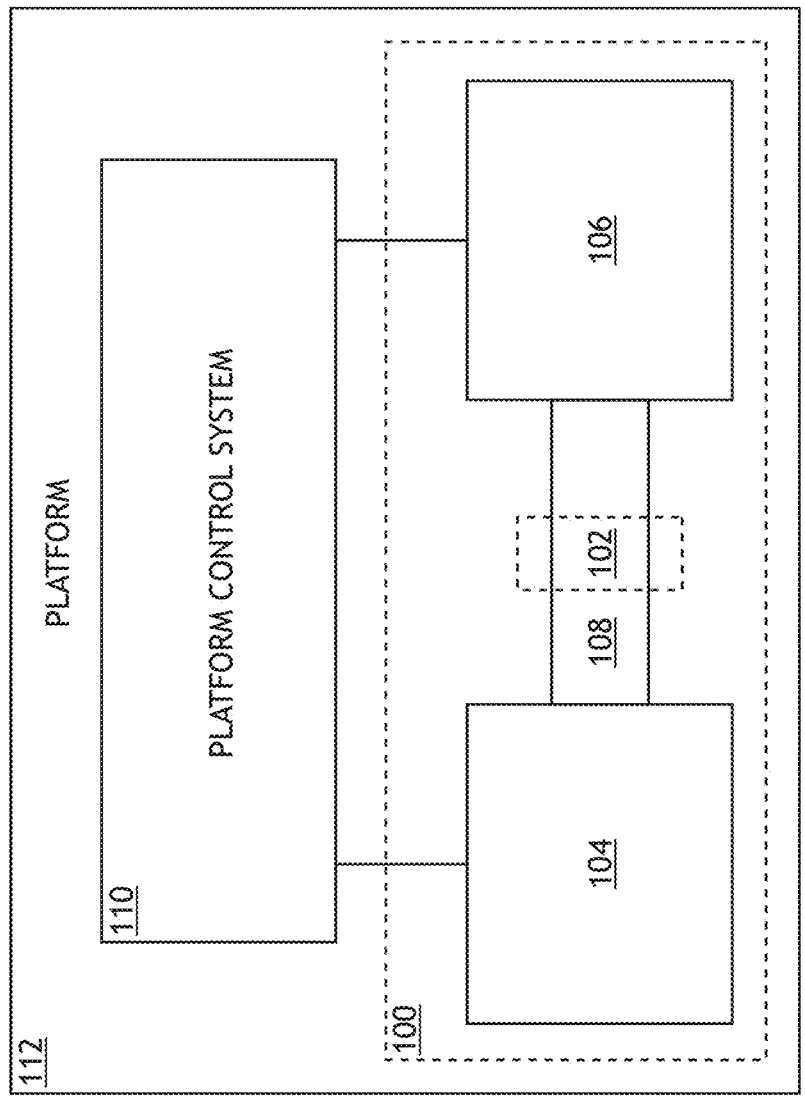
FIG. 1 is a block diagram of an exemplary embodiment of a redundant mechanical control system, according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., $1$, $1a$, $1b$). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, the inventive concepts disclosed herein are directed to a jam override system, a detent apparatus, and methods for monitoring the detent apparatus. The jam override system may be a subsystem of a parallel or redundant mechanical control system. The jam override system incorporates a light-weight detent apparatus and a ball plunger assembly to provide an adjustable override or breakout force. The adjustable override or breakout force is a force that is greater than an axial force or an applied force associated with the detent apparatus. If the override or breakout force is applied, the detent apparatus allows a first or a second half of the parallel or redundant mechanical control system to operate independently of the other half, despite the existence of a jam condition, avoiding a system failure that may lead to catastrophic failure and avoiding significant workloads associated with conventional systems. The use of the jam override system provides a robust, modular alternative that reduces costs associated with design and installation, weight, duplication of non-recurring engineering (NRE), calibration, and operator workload, and increases speed of repair and adaptability. Those skilled in the art will recognize other advantages obtained by the inventive concepts disclosed herein.

In embodiments, the jam override system is in compliance with applicable industry standards, guidelines, and federal regulations. For example, the jam override system may comply with 14 C.F.R. § 25.1309, such that any mechanical failure condition to prevent safe flight and landing of an aircraft is extremely improbable. For instance, in some embodiments, a probability of failure is less than $10^{-9}$, meeting low probability of failure requirements. Further, in some embodiments, the jam override system may include sensors or proximity switches that relay a signal to a display of the aircraft (e.g., primary flight display (PFD), multifunction display (MFD), or similar display) to provide a warning to the pilot or crew that a jam condition exists, or that a malfunction occurred resulting in the existence of the jam condition. Those skilled in the art will recognize other features of the inventive concepts disclosed herein that help enable compliance with 14 C.F.R. § 25.1309 or other regulations.

Referring now to FIG. 1, a block diagram of an exemplary embodiment of a redundant mechanical control system 100 is depicted. The system 100 includes a jam override subsystem 102, a first actuating portion 104, a second actuating portion 106, and a break-away interconnect 108. Each of the first actuating portion 104 and the second actuating portion 106 of the redundant mechanical control system 100 are in communication with a platform control system 110 of a platform 112.

In embodiments, the jam override subsystem 102 resides in, transitions between, or obtains at least two different conditions or modes of operation. In an engaged mode or normal condition of operation, the jam override subsystem 102 enables the break-away interconnect 108 to act as a single rod, transmitting compression and extension loads back-and-forth (e.g., left to right or right to left) between actuating portions 104 and 106. In a disengaged mode of operation, the compression and extension loads are prevented from transmission between portions 104 and 106 due to a breakout effect of the break-away interconnect 108. In embodiments, the breakout effect of the interconnect 108 includes a telescopic effect.

In embodiments, the first actuating portion 104 and the second actuating portion 106 of the redundant mechanical control system 100 include user interfacing mechanisms to actuate, excite, or provide user control to the platform 112. For example, the interfacing mechanisms may include, but are not limited to, a yoke, a wheel, a column, a brake pedal, a lever, a pulley, a button, a haptic sensor (e.g., touchscreen), an audio input device (e.g., microphone), an eye sensor, and combinations thereof.

In embodiments, the platform control system 110 includes a vehicle control system for stopping, directing, steering, or otherwise controlling a vehicle. For example, the platform control system 110 may include any control mechanism that provides vehicle control, including but not limited to, brakes, wheels, ailerons, rudders, servo motors, elevators, control surfaces (e.g., for adjusting trim), and combinations thereof.

In embodiments, platform 112 incorporating the jam override subsystem 102 may include a vehicle. For example, the platform 112 may include an aircraft such as a passenger airplane (e.g., 787, 797, etc.), an unmanned aerial system (UAS), an unmanned aerial vehicle (UAV), a ground vehicle, a naval vehicle, or any vehicle relying on a redundant or parallel mechanical control system.

Figure 2:
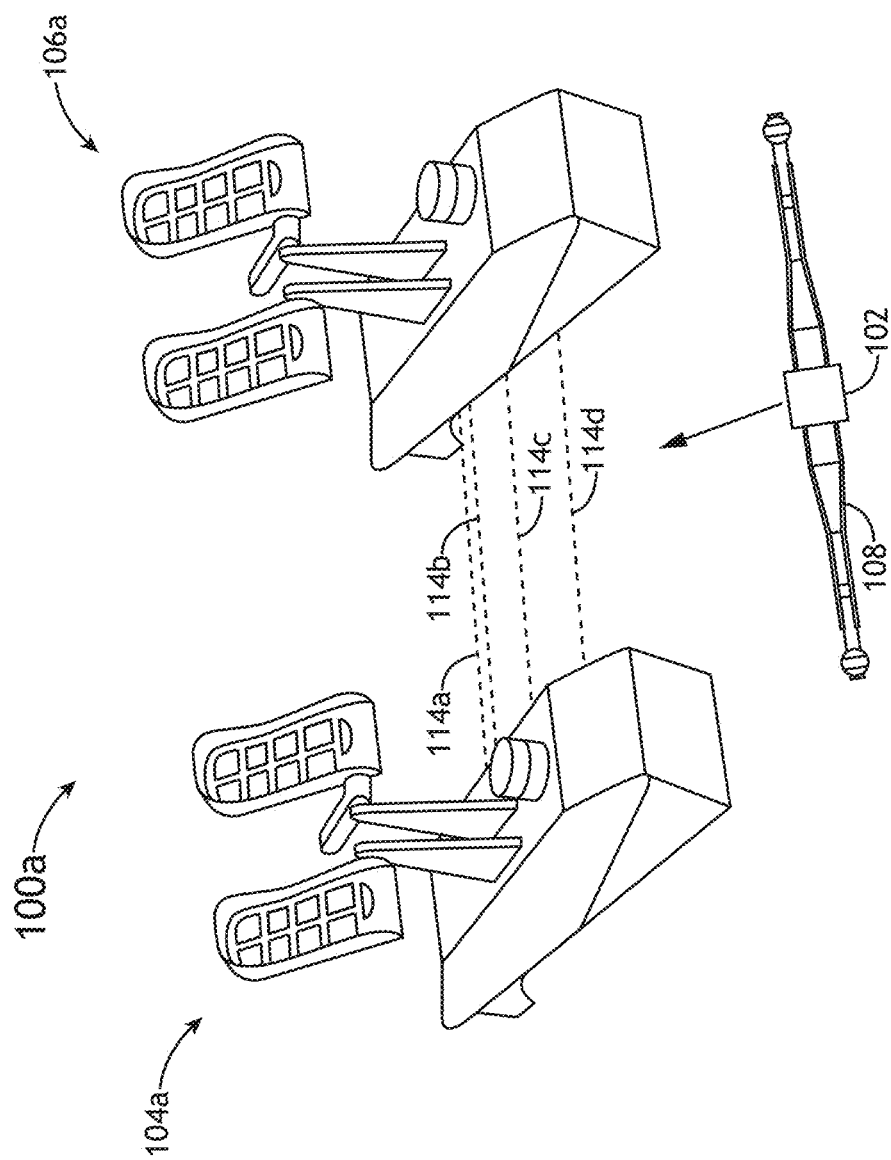
FIG. 2 is a perspective view of an exemplary embodiment of a redundant mechanical control system, according to the inventive concepts disclosed herein.

Referring now to FIG. 2, an exemplary embodiment a redundant mechanical control system 100a is depicted. The system 100a may include a first portion 104a and a second portion 106a of a wheel-, column-, rudder-, and/or brake-pedal unit of an aircraft. It is noted that the system 100a, the first portion 104a, and the second portion 106a may function similarly to the system 100, the first actuating portion 104, and the second actuating portion 106, except that the system 100a, the first portion 104a, and the second portion 106a may be implemented on an aircraft.

It is noted that the wheel-, column-, rudder-, and/or brake-pedal unit of FIG. 2 may require mechanical override coupling between pilot and co-pilot controls. In this regard, the break-away interconnect 108 may be used instead of conventional interconnect devices. For example, the break-away interconnect 108 may be used in any one of locations 114a-114d. By way of another example, the break-away interconnect 108 may include multiple interconnects, with a single interconnect of the multiple interconnects being used in each position of the multiple positions 114a-114d.

Figure 3:
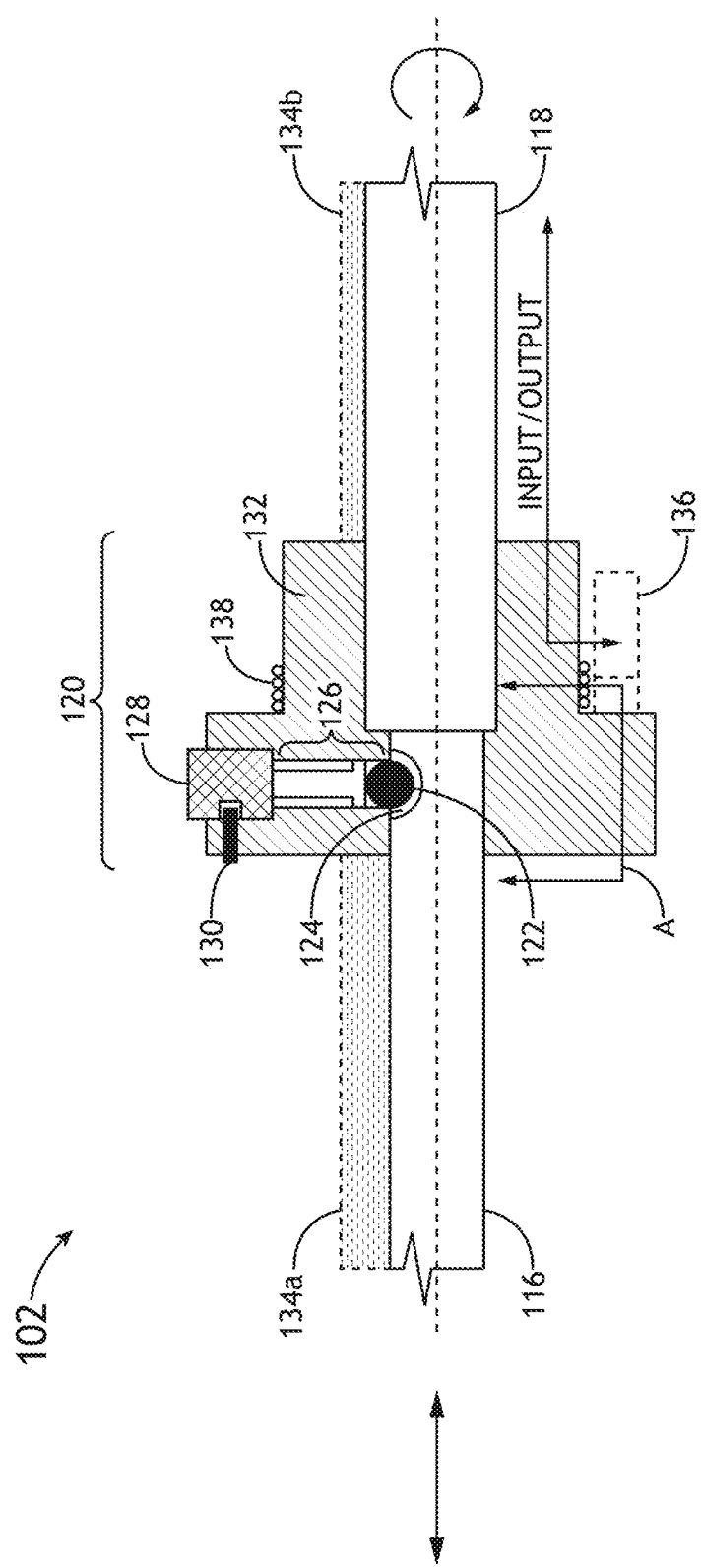
FIG. 3 is a block diagram of an exemplary embodiment of a jam override subsystem, according to the inventive concepts disclosed herein.

Referring now to FIG. 3, the jam override subsystem 102 includes an inner tube 116, an outer tube 118, and a detent apparatus 120. The detent apparatus 120 is configured to provide one or more axial forces that, if overcome, enables the inner tube 116 to extend and retract freely through the outer tube 118. For example, the inner tube 116 may have a slightly smaller diameter than a diameter of the outer tube 118 at a junction of the inner tube 116 and the outer tube 118. It is noted that in the disengaged mode of operation the compression and extension loads are prevented from transmission between portions 104 and 106 of the redundant mechanical control system 100 due to an excitation or actuation of the detent apparatus 120 (e.g., override or breakout force is applied), which results the breakout or telescopic effect of the break-away interconnect 108. In this regard, in some embodiments, an edge of at least the inner tube 116 may be beveled or slightly ramped to help with alignment within the outer tube 118.

In embodiments, the detent apparatus 120 of the jam override subsystem 102 includes a lock-ball 122 configured to partially fit within a hole or a lock-ball seat 124 that is formed in a portion of the inner tube 116. For example, a diameter of the lock-ball seat 124 may be smaller than a diameter of the lock-ball 122.

Figure 3A:
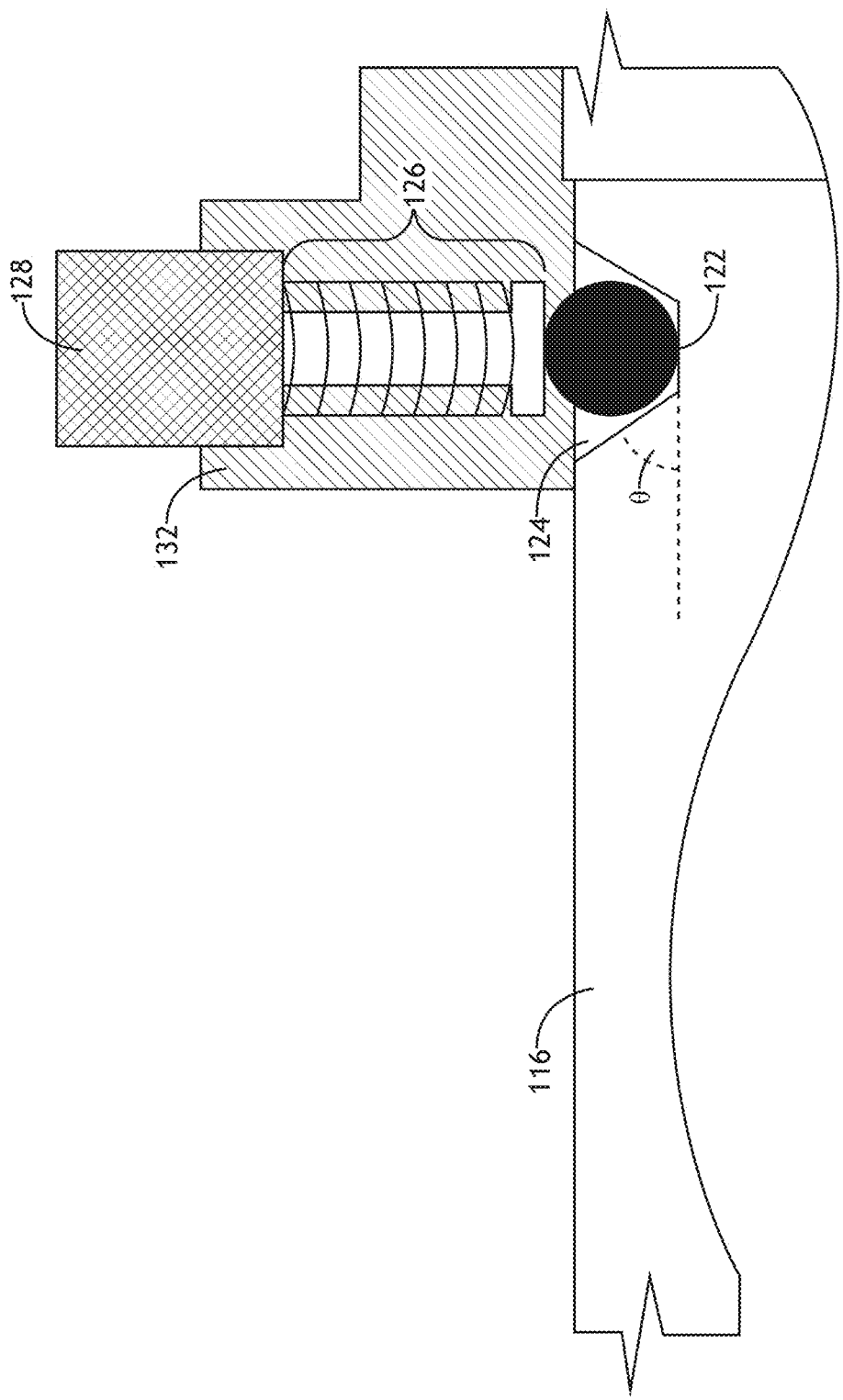
FIG. 3A is a block diagram of an exemplary embodiment of a portion of a jam override subsystem, according to the inventive concepts disclosed herein.

It is noted that while FIG. 3 is depicted with no detent ramp seat angle, this depiction is not meant to be limiting. For example, referring now to FIG. 3A, the lock-ball seat 124 of the inner tube 116 may include a ramp seat angle, theta ($\theta$), where an amount or a degree of the incline may affect the amount of breakout force associated with the detent apparatus 120.

In embodiments, the lock-ball seat 124 includes multiple holes or seats positioned symmetrically around an outer circumference of the inner tube 116. For example, four lock-ball seats 124 may be positioned at 90 degree intervals around the 360 degree circumference of the inner tube 116.

In embodiments, the detent apparatus 120 may further include a spring and plunger assembly 126 to apply an axial force to the lock-ball 122. The spring and plunger assembly 126 may include a lock spring and lock plunger. For example, the lock spring may include a helical compression spring that resists a compression load and exerts an axial force against a surface of the plunger due to the resistance. In some embodiments, the lock-ball 122 includes multiple lock-balls (e.g., four), and a number of spring and plunger assemblies 126 may coincide with the number of lock-balls 122. It is noted that in an engaged mode or condition, a symmetrical placement of the spring and plunger assemblies 126 coinciding with the lock-ball seats 124, provides for an even distribution of axial forces around the circumference of the inner tube 116 by way of the lock-ball 122.

In embodiments, the override or breakout force is based on a number of lock-balls 122 and spring and plunger assemblies 126 incorporated in the detent apparatus 120. In some embodiments, the override or breakout force is based on physical characteristics of the spring and plunger assembly 126. For example, the physical characteristics may include an amount of bias, a spring constant, a size, or a number of coils associated with the spring of a spring and plunger assembly 126. In this regard, the axial force associated with the spring and applied to a surface of the plunger may be determined according to Hooke's law, which provides as follows: where $F_s$ is a spring force proportional or substantially equivalent to the axial force exerted on the surface of the plunger, k is the spring constant, and x is the spring displacement (e.g., compression relative to its equilibrium position).

In other embodiments, the governing equation for the override or breakout force is based on a combination of the number of lock-balls 122 and spring and plunger assemblies 126, the physical characteristics of the spring and plunger assembly 126, frictional forces, $f_k$, associated with the detent apparatus 120, and an angle, theta ($\theta$) (e.g., ramp angle), of the detent apparatus 120. For example, if springs with the same spring constant k are used, then the applied force of the detent may be as follows:

$$F \approx -Nkx \text{ or } NF_s$$

where F is the applied force of the detent apparatus 120, N is the number or count of spring systems distributed around the circumference of the portion of the inner tube 116 at or near the junction of the inner tube 116 and the outer tube 118, x is the spring displacement, and k is the spring constant. In this regard, the applied force, F, is the downward force applied to an inclined plane (e.g., incline according to theta ($\theta$)) that must be overridden by compression or extension forces. When the applied force, F, and the compression/extension force, C, are in equilibrium, the breakout force is given by the following:

$$\text{breakout force} = \frac{F}{\tan(\theta)} \text{ or}$$

$$\text{breakout force} = \frac{kx * N}{\tan(\theta)}$$

where theta (θ) is the detent seat ramp angle. It is noted that the breakout force is a resulting force that must be overridden (e.g., by pilot override force) for a breakout condition to occur.

In some embodiments, a pilot override force required for the breakout condition is proportional to the breakout force. For example, the breakout force and thereby the pilot override force requirement may be increased proportionally by the frictional forces, $f_k$, including but not limited to, a rolling friction of the lock-ball 122, friction between the lock-ball 122 and the telescoping arms, friction between the spring system and lock-ball 122, friction between the telescoping or break-away interconnect 108, and combinations thereof.

In embodiments, the breakout condition results from an extension or compression force, C, applied at one half of the redundant or parallel control system, where the extension or compression force, C, overrides or is greater than the breakout force associated with the detent apparatus 120. For example, the lock-ball 122 in the lock-ball seat 124 will be prevented from movement due to one or more frictional forces, $f_k$, and the breakout force. In this regard, when the compression or extension force, C, is applied at one half of the redundant mechanical control system and is sufficient to overcome a potential energy ($P_E$) created by the one or more frictional forces, $f_k$, and the breakout force, resulting kinetic energy ($K_E$), then the breakout condition occurs. When the breakout condition occurs, the lock-ball 122 is unseated from the lock-ball seat 124 and the interconnect 108 breaks away, allowing one half of the redundant mechanical control system 100 to operate independent of the other half. In other words, If $K_E$ or if C>breakout force, then B
where $K_E$ is kinetic energy resulting when the lock-ball 122 is unseated, C is a compression or extension force (e.g., pilot override force), and B is the breakout condition of the jam override subsystem 102.

In some embodiments, the gravitational forces exerted on the lock-ball 122 are not taken into account in determining potential energy because the mass of the lock-ball is so small or negligible.

In some embodiments, an angle, theta (θ), of the detent apparatus 120 can be modified or developed to be adjustable such that the breakout force can be adjusted. For example, a ramp angle of the lock-ball seat 124 may be formed at one or more angles of multiple possible angles depending on an amount of breakout force desired for system 100. By way of another example, an angle of a side-wall of the lock-ball seat 124 may be configured to be adjustable by sliding means or rotational means, where some or all of the sliding means (e.g., runner, channel, etc.) or rotational means (e.g., gears, teeth, threaded portions, etc.) may be located within the inner tube 116, accessed for adjustment from an exterior portion of the inner tube 116, and may be flush with the exterior of the inner tube 116 such that the telescopic effect of the break-away interconnect 108 is not hindered.

In some embodiments, the detent apparatus 120 may further include a set screw 128. The set screw 128 may be configured to be adjusted (e.g., tightened and/or loosened) to increase or decrease the breakout force, the override force required, or the applied force, F, provided by the detent apparatus 120. In other words, the set screw adjusts the displacement, x, of the spring of the spring and plunger assembly 126.

In some embodiments, a pin or other locking mechanism 130 is provided to lock the set screw 128 and/or the spring and plunger assembly 126 in a desired position. In this regard, the pin/locking mechanism 130 is retractable or unlockable. For example, the pin 130 may be a quick release detent pin, and may be retracted by overcoming a force provided by a ball of the quick detent pin. In some embodiments, the set screw 128 includes multiple (e.g., four) set screws, coinciding with the number of lock-balls 122 used.

In some embodiments, the detent apparatus 120 may include a housing 132 to house, or partially house, the inner tube 116, the outer tube 118, the lock-ball 122, the spring and plunger assembly 126, the set screw 128, and the pin/locking means 130. For example, the housing 132 may include an opening through which the inner tube 116 and the outer tube 118 may be inserted, a hole into which the lock-ball 122 and the spring and plunger assembly 126 may be inserted, and one or more optional connectors or connector holes for attaching sensors to the housing. The housing 132 may further include a threaded portion above the hole for receiving the set screw 128 and to further enable adjusting of the breakout force, the override force required, or the applied force, F.

In some embodiments, the housing 132 may be rotatably connected to the inner tube 116 and the outer tube 118. For example, the housing 132 may include a breakout housing with one or more bearings to enable rotation of the breakout housing 132 around a portion of the inner tube 116 and a portion of the outer tube 118. In other embodiments, the housing 132 may be slidingly connected to the inner tube 116 and the outer tube 118. For example, the housing 132 may be slidingly connected to the portions of the inner tube 116 and the outer tube 118 by way of an alignment rail 134. In this regard, the housing 132 may include an indented, hollow, or cut-out portion to facilitate the sliding connection of the housing 132 along the alignment rail 134. It is noted that in some embodiments, the alignment rail 134 (or portions thereof) is an optional feature of the detent apparatus 120.

In some embodiments, the detent apparatus 120 may include a failure monitor 136. The failure monitor 136 may include one or more sensors, proximity switches/sensors, field sensors, microswitches, strain/load sensors, electronically monitored shear pins, potentiometers/resolvers, or slip fit electrical contacts configured to detect when a mechanical failure occurred in the mechanical redundant control system used in the platform in which the jam override system is incorporated.

Figure 4:
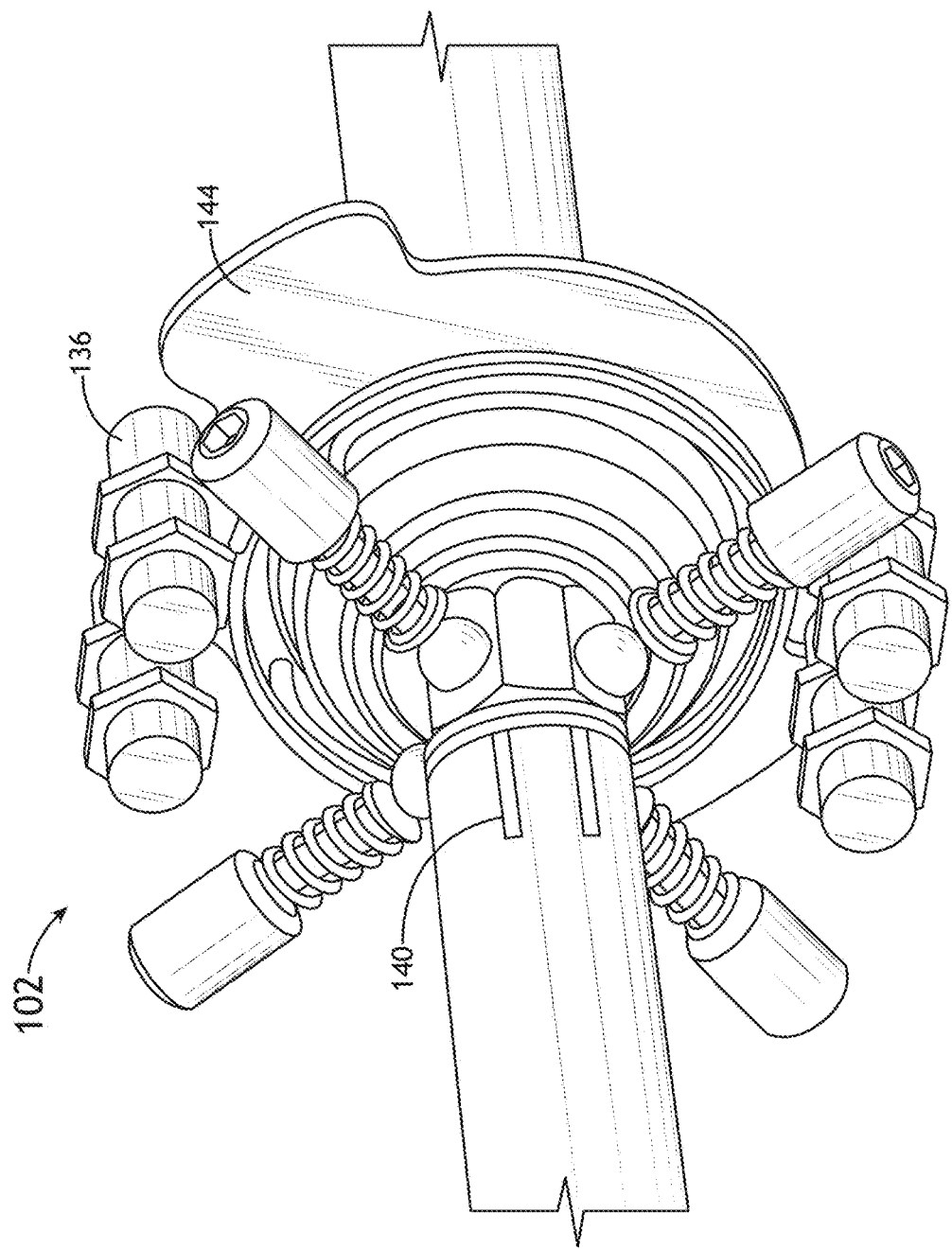
FIG. 4 is a perspective view of a partially deconstructed exemplary embodiment of a jam override subsystem, according to the inventive concepts disclosed herein.

In some embodiments, the failure monitor 136 includes communication means, including but not limited to, wired, wireless, Bluetooth, infrared, combinations thereof, or similar communication connection means to relay a sensed or detected position or condition of the jam override subsystem 102. For example, the failure monitor 136 may detect a first position of the inner tube 116 with respect to the outer tube 118 such that when the first position changes to a second position, this information is relayed to an operator alerting the operator that the jam override subsystem 102 has been excited/actuated due to a mechanical failure. By way of another example, the detent apparatus 120 may include one or more target or contact plates 144 (see, for example, FIG. 4), and the failure monitor 136 may include a proximity switch 136 or a Hall Effect sensor. In this regard, the proximity switch/sensor 136 may be configured to detect when the one or more target plates 144 are in close proximity to the proximity switch/sensor 136. In this regard, the target plates 144 will be in close proximity to the proximity switch/sensor 136 when the axial forces of the detent apparatus 120 are overcome, allowing the torsion spring 138 (below) to engage and rotate.

In some embodiments, the detent apparatus 120 is self-healing. For example, the detent apparatus 120 and the alignment rail 134 may be configured to maintain an alignment of the detent apparatus 120 along both the inner tube 116 and the outer tube 118, enabling in-part the self-healing aspect. For instance, the pilot overriding force may have been applied due to a mechanical failure that occurred in a first half of a redundant mechanical control system, dislodging the lock-ball 122 from the lock-ball seat 124. In this regard, the lock-ball 122 will be free to move back-and-forth along the inner tube 116 as the inner tube 116 extends and retracts through (e.g., telescoping effect) the outer tube 118, enabling continued and uninterrupted use of the second half of the redundant mechanical control system. During runtime, if the mechanical failure is fixed, removed, or no longer exists, a portion 134a or a portion 134b of the alignment rail 134 maintains an alignment of the inner tube 116 with respect to the outer tube 118 and with respect to the detent apparatus 120 such that the inner tube 116 may extend, allowing the lock-ball 122 to drop back into (e.g., re-seat within) the lock-ball seat 124 and enabling further use of both halves of the redundant mechanical control system. It is noted that once dislodged, the lock-ball 122 requires very minimal or negligible force for movement along the inner tube 116.

In some embodiments, the detent apparatus 120 may include the torsion spring 138. The torsion spring 138 may be configured to provide a rotational force or torque to the inner tube 116, the outer tube 118, or the detent apparatus 120. The rotational force or torque may be simultaneous with or substantially simultaneous with a mechanical failure and excitation of the jam override system (e.g., via application of breakout force). In this regard, the torque causes an intentional misalignment of the lock-ball 122 from the lock-ball seat 124 and a misalignment of the detent apparatus 120 with respect to the inner tube 116. It is noted that the amount of force provided by the torsion spring 138 will be less than the required override force and the breakout force. In this regard, the torque of the torsion spring 138 will not be applied until the greater override force is applied. Thus, on a spectrum of the forces associated with the breakout condition of system 100, the following is true:

$$C > \text{breakout force} > T$$

where C is the overriding compression or extension force applied by a portion (e.g., 104 or 106) of the system 100 after a mechanical failure, and T is the torque associated with the torsion spring 138.

In some embodiments, the detent apparatus 120 is capable of a maintenance lock engagement mode of operation. For example, due to the torque of the torsion spring 138, a maintenance lock engagement mode may occur where the lock-ball 122 may not re-enter or re-seat itself in the lock-ball seat 124 until a mechanic or other skilled operator accesses the detent apparatus 120 and resets the detent apparatus 120. For instance, an aircraft-on-ground maintenance check may be required to rotate and reset subsystem 102, re-engaging the detent apparatus 120 or re-seating the lock-ball 122. In other embodiments, a second torsion spring (not shown) may be used to re-engage the jam overrides subsystem 102 after the mechanical failure has been repaired or checked. For example, the second torsional spring may include a motor, an actuator, or a solenoid, which when actuated or engaged enables the reset or re-seating.

In some embodiments, the detent apparatus is capable of a reset mode of operation. For example, the reset mode of operation may occur any time the detent apparatus 120 is reset after a mechanical failure or the detent apparatus is re-configured to re-engage both halves of the redundant mechanical control system 100.

In some embodiments, the detent apparatus 120, the inner tube 116, or the outer tube 118 may include one or more indicators 140 (see FIG. 4) to indicate when the jam override subsystem 102 is engaged (e.g., enabling operation of both halves of a redundant control system) or disengaged (e.g., control jam exists/occurred). For example, one or more lines, a position sensor, or other indicating means may be used to show when the torsion spring 136 has applied torque to rotate and misalign the detent apparatus 120 with respect to the inner tube 116.

Figure 5:
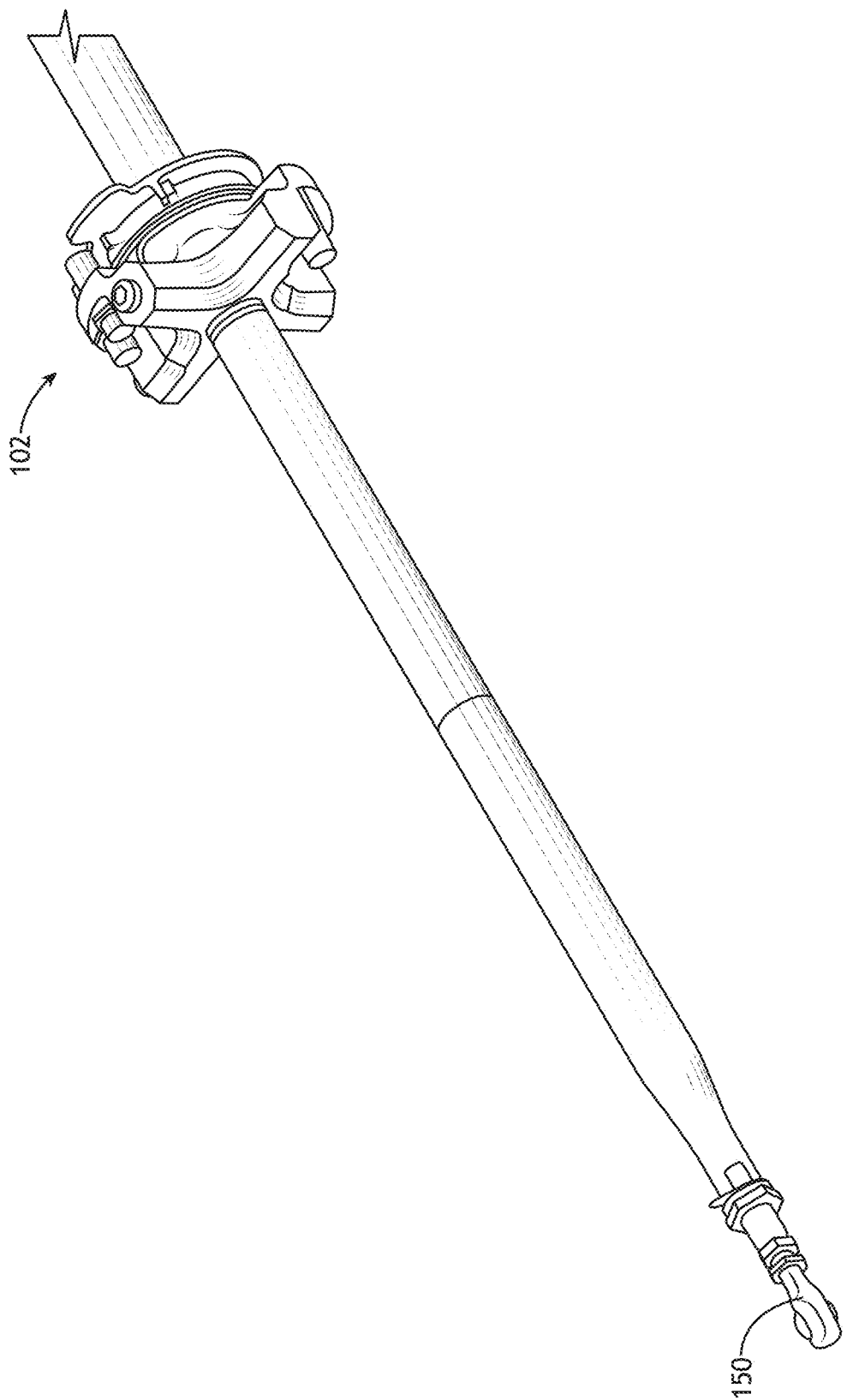
FIG. 5 is a perspective view of an exemplary embodiment of a jam override subsystem, according to the inventive concepts disclosed herein.
Figure 6:
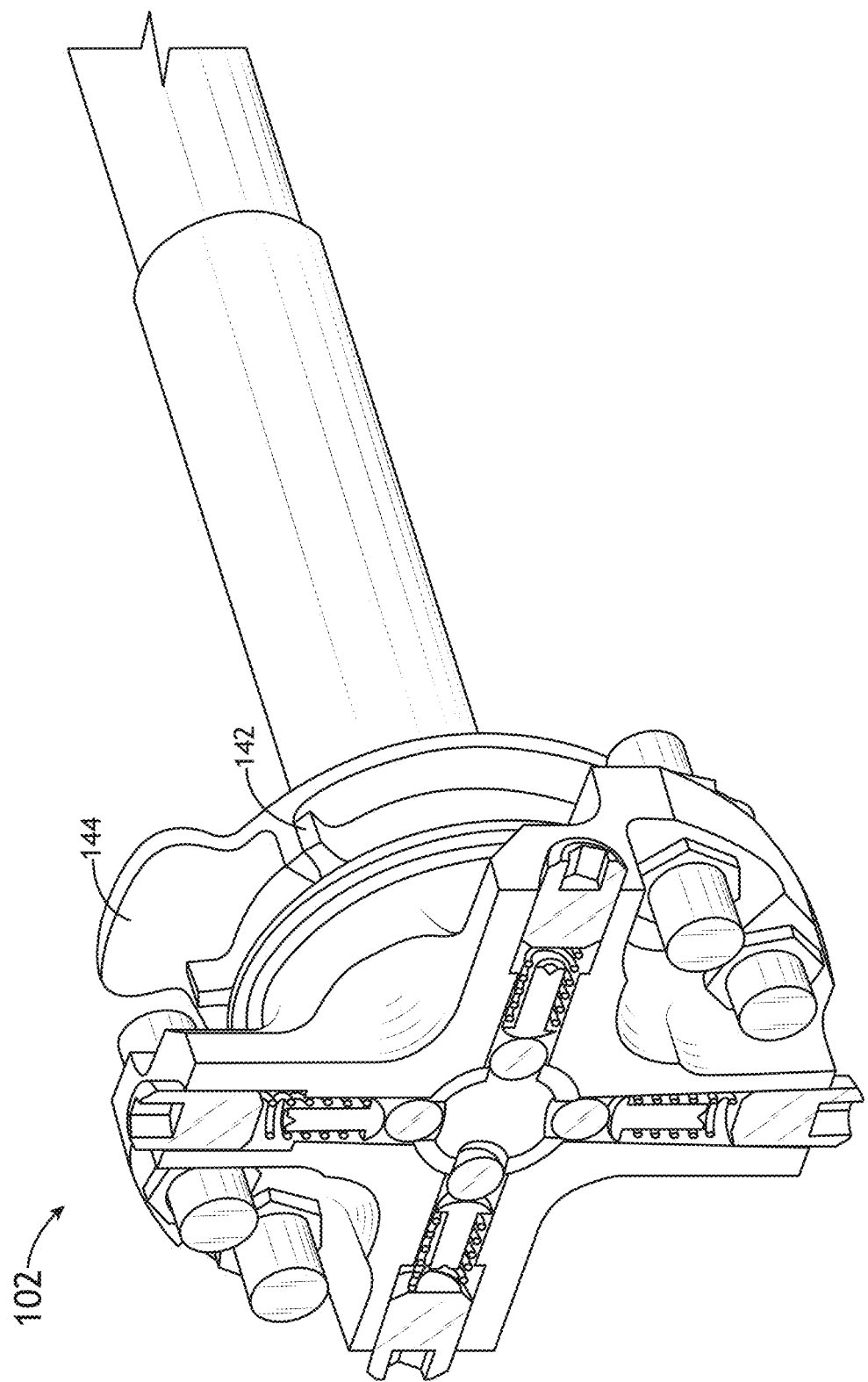
FIG. 6 is a sectional view of an exemplary embodiment of a jam override subsystem, according to the inventive concepts disclosed herein.

In some embodiments, the detent apparatus 120 includes one or more flanges 142 to prevent the housing 132 from being rotated too far by the torsion spring 138. For example, referring now to FIGS. 4 and 5, target plate 144 may be fixed to the outer tube 118 and a first portion (e.g., hook) of the torsion spring 138 may be coupled or in connection with a portion of the target plate 144 and a second portion (e.g., hook) of the torsion spring 138 coupled or in connection with a portion of the detent apparatus 120 to rotate the detent apparatus 120 when the axial force of the detent apparatus 120 is overcome. In this regard, a first flange associated with the target plate 144 may rest against a second flange when the detent apparatus 120 is engaged and may rest against a third flange when the detent apparatus 120 is disengaged. It is noted that the second and third flanges are associated with, integrated with, or formed on the detent apparatus 120 such that they rotate together with the detent apparatus 120, while the first flange remains stationary.

Figure 7:
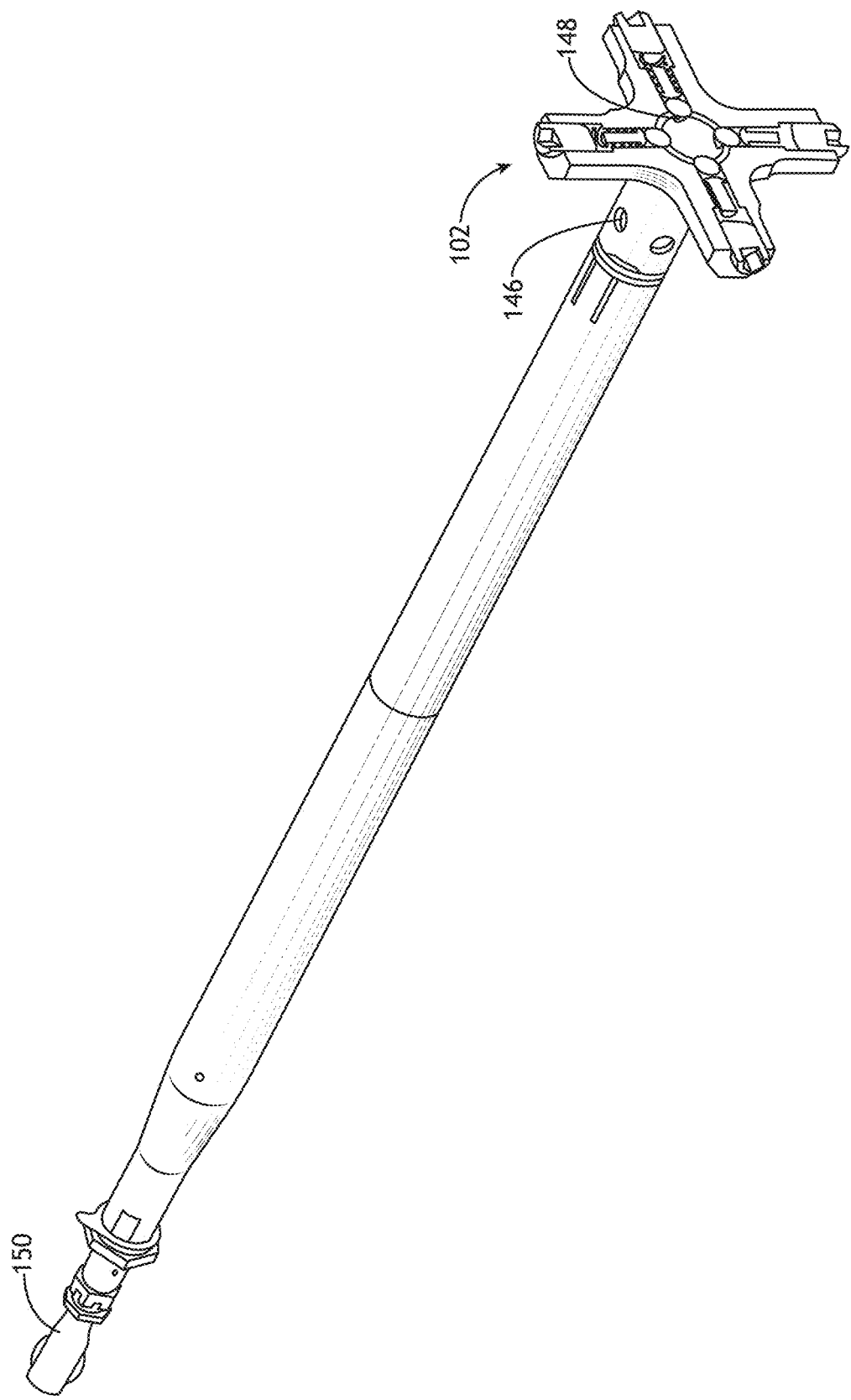
FIG. 7 is a sectional view of an exemplary embodiment of a jam override subsystem, according to the inventive concepts disclosed herein.
Figure 8:
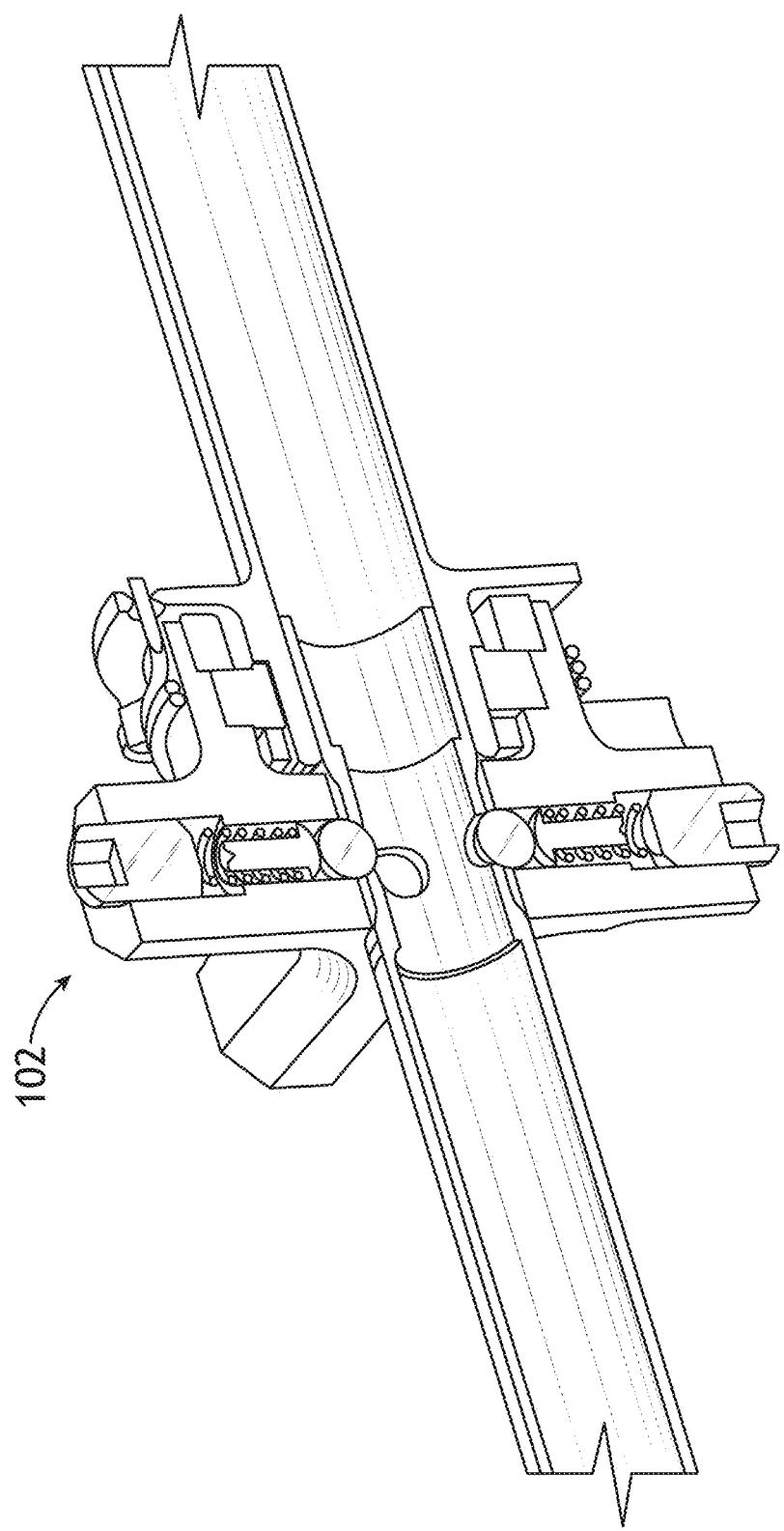
FIG. 8 is a sectional view of an exemplary embodiment of a jam override subsystem, according to the inventive concepts disclosed herein.

In some embodiments, the lock-ball seat 124 includes two or more sets of holes or lock-ball seats to provide for an adjustable length of the jam override subsystem 102, or to accommodate different lengths of separation between halves of a redundant mechanical control system. For example, referring now to FIG. 7, a first set of lock-ball seats 146 may be formed at a first length of the inner tube 116 and a second set of lock-ball seats 148 may be formed at a second length of the inner tube 116.

In some embodiments, the jam override subsystem 102 may be adjustable in length due to an adjustable connector 150 at one or more ends of the break-away interconnect 106. For example, the adjustable connector 150 may include a ball-joint connector with a threaded portion that enables another one or more degrees of adjustability to a length of the jam override subsystem 102. By way of another example, the adjustable connector 150 may include an axial-joint, a universal-joint, a fork connector, a rod end bearing (self-lubricating or non-lubricating), quick-fit couplings (with or without radial off-set compensation), and combinations thereof.

In some embodiments, the jam override subsystem 102 is incorporated into the mechanical control system 100 or 100a via the adjustable connector 150. It is noted that those skilled in the art will recognize other connection means to incorporate the jam override subsystem 102 with the mechanical control system 100 or 100a.

Figure 9:
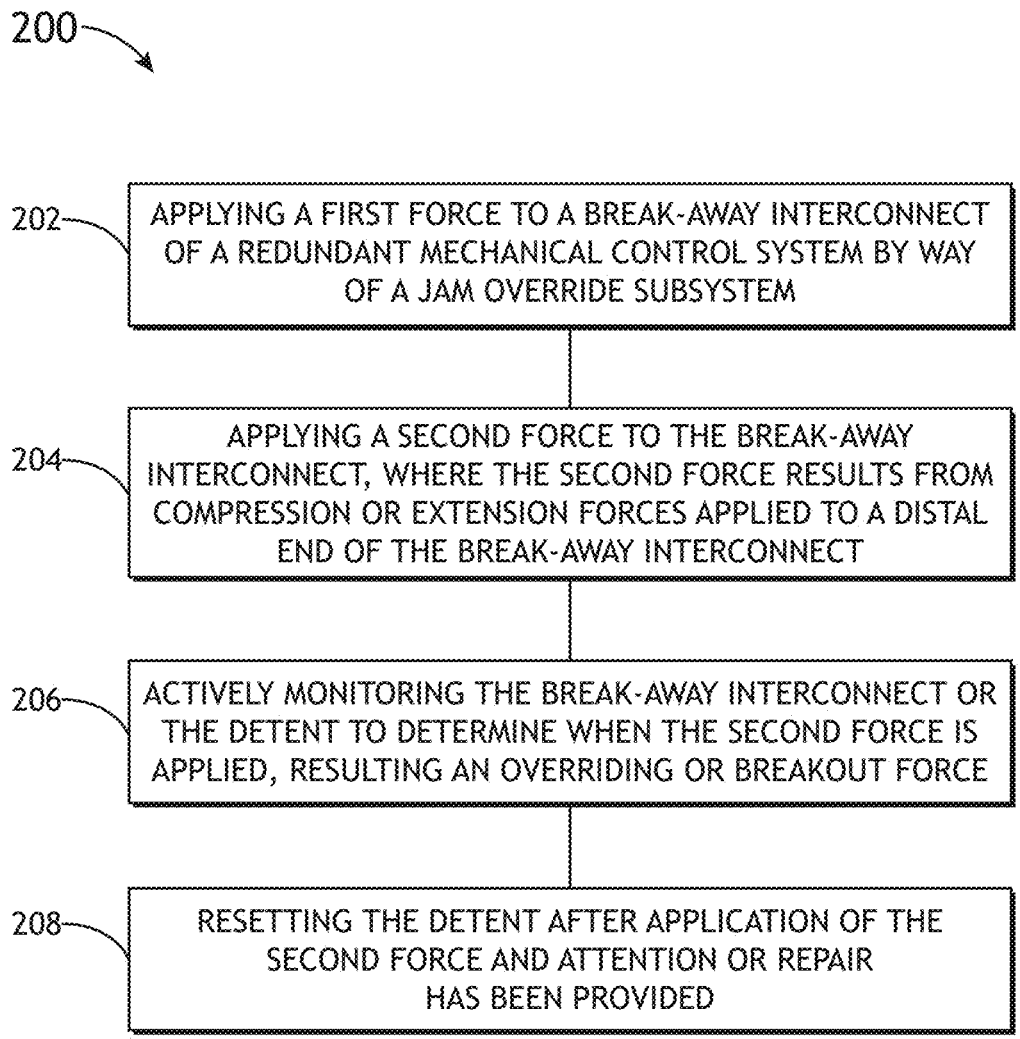
FIG. 9 is a method, according to the inventive concepts disclosed herein.

Referring now to FIG. 9 an exemplary embodiment of a method 200 according to the inventive concepts disclosed herein may include one or more of the following steps. For example, the method 200 may be a method for actively monitoring a self-healing spring detent.

A step 202 of the method 200 may include applying a first force to a break-away interconnect of a redundant mechanical control system by way of a jam override subsystem. For example, the first force may be applied axially via a detent apparatus, a ball, a spring, a plunger, or combinations thereof.

A step 204 may include applying a second force to the break-away interconnect. For example, the second force may be applied by way of compression or extension to a distal end of the break-away interconnect, where the term distal is used with respect to the first force, the detent apparatus, the ball, the spring, or the plunger. In this regard, the second force may be an overriding force.

A step 206 may include actively monitoring the break-away interconnect or the detent apparatus to determine when the second force is applied and results in a breakout or break-away condition. For example, an electronically monitored shear pin may indicate when the second force is applied, the breakout force is overcome, and a telescopic effect of the break-away interconnect occurs. By way of another example, the break-away interconnect may include a jam override subsystem with a first torsion spring and a proximity sensor and contact plate may indicate when the second force is applied, allowing first torsion spring to rotate the detent apparatus.

A step 208 may include resetting the detent apparatus after the second force is applied. For example, a mechanical reset may occur after the failure resulting in the breakout condition has been repaired. In this regard, a mechanic may be required to physically access the detent apparatus and rotationally reset the detent apparatus. By way of another example, the jam override system may include a second torsion spring, a solenoid, a motor, a wireless/remote actuator, or combinations thereof, which may allow for an electronic, remote, and/or wireless reset of the detent apparatus. It is noted that although the mechanical failure resulting in the breakout condition may still require attention and/or repair, the electronic, remote, and/or wireless aspect may enable quicker repair time or decreased operator workload.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A redundant mechanical control system, comprising:
a first actuating portion;
a second actuating portion;
a break-away interconnect; and
a jam override subsystem comprising a detent apparatus to provide an axial force, the first actuating portion and the second actuating portion being mechanically linked via the break-away interconnect until an overriding force is received by the jam override system, the overriding force being larger than the axial force of the detent apparatus, the detent apparatus comprises a plurality of assemblies, each assembly of the plurality of assemblies including a lock-ball, a spring, a plunger, and a lock-ball seat, each assembly of the plurality of assemblies of the detent apparatus is located around a first circumference of an inner tube of the break-away interconnect, wherein the overriding force is an extension force or a compression force applied to an end of the break-away interconnect, wherein the detent apparatus further comprises a torsion spring, the torsion spring is configured to rotate the inner tube when a breakout condition has occurred with the detent apparatus as a result of the overriding force.

2. The system of claim 1, wherein the jam override subsystem obtains at least two conditions or modes of operation from the following: an engaged condition or a normal mode of operation, the breakout condition or a disengaged mode of operation, a maintenance lock engagement mode of operation, and a reset mode of operation.

3. The system of claim 1, wherein the break-away interconnect experiences a telescopic effect when the overriding force is received and the breakout condition is created.

4. The system of claim 1, further comprising:
one or more connectors to connect a first end of the break-away interconnect with the first actuating portion and to connect a second end of the break-away interconnect with the second actuating portion.

5. The system of claim 1, wherein the break-away interconnect has an adjustable length.

6. The system of claim 1, wherein each assembly of the plurality of assemblies of the detent apparatus comprises a set screw, wherein the set screw provides an ability to adjust the axial force applied to the lock-ball.

7. The system of claim 1, wherein the inner tube includes an indicator to indicate when the inner tube has been rotated after the breakout condition has occurred with the detent apparatus.

8. The system of claim 7, wherein a lock-ball is misaligned with a lock-ball seat when the inner tube has been rotated after the breakout condition has occurred with the detent apparatus.

9. The system of claim 1, wherein the break-away interconnect includes a proximity sensor, the proximity sensor configured to detect a first position of the inner tube with respect to an outer tube such that when the first position changes to a second position, the proximity sensor provides an alert.

* * * * *